April 3, 1928.
F. B. C. SUTTHERY
1,665,182
DEVICE CONVERTING PIPE WRENCHES INTO PIPE VISES
Filed Feb. 16, 1927
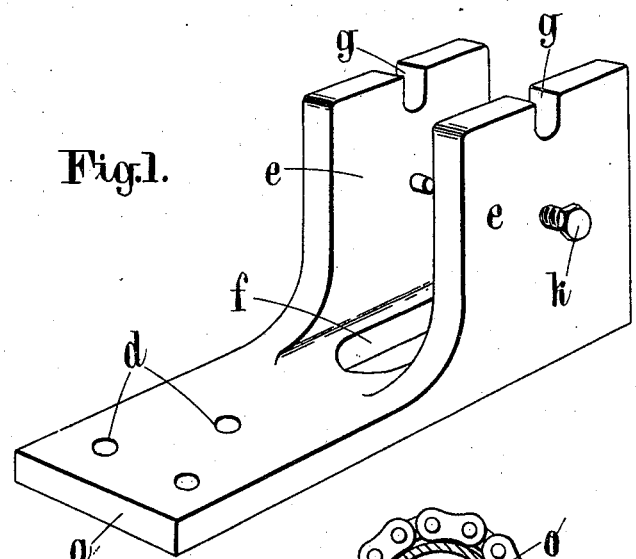
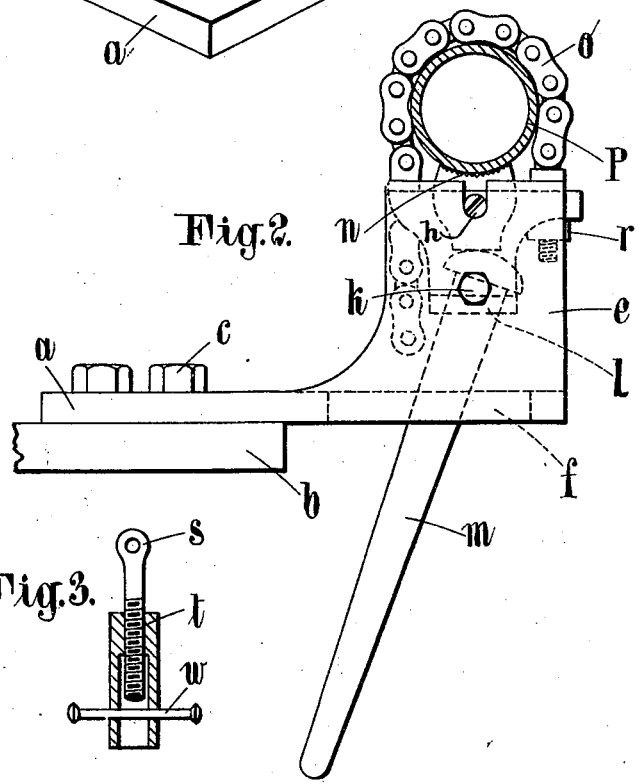
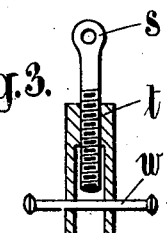
INVENTOR
F.B.C.Sutthery
BY
ATTORNEY Patented Apr. 3, 1928.

1,665,182

UNITED STATES PATENT OFFICE.

FRANK BERTRAM CHISWELL SUTTHERY, OF LONDON, ENGLAND.

DEVICE CONVERTING PIPE WRENCHES INTO PIPE VISES.

Application filed February 16, 1927, Serial No. 168,766, and in Great Britain March 1, 1926.

This invention relates to pipe vises and has for its object to provide a simple convenient and portable device that permits any pipe wrench to be used as a pipe vise and is more particularly adapted for the accommodation of that kind of chain pipe wrench in which a lever with a cam shaped end actuates a rockably mounted V-shaped gripping jaw that co-operates with the chain to grip the pipe the cam-shaped end of the lever and the jaw being enclosed within a housing.

A device constructed according to the present invention comprises a base adapted to be secured to a bench or worktable and provided with a slot and a bracket on each side of said slot in order to accommodate and secure a pipe wrench in such a manner that it can be used as a pipe vise.

Such a device is illustrated in a perspective view in Figure 1 of the accompanying drawing.

Figure 2 being a side elevation shewing the device in use as a pipe vise and

Figure 3 an alternative means for adjusting the chain.

Similar reference characters relate to like parts in all the figures of the drawing on referring to which it will be appreciated that the device comprises a base $a$ adapted to be attached to a bench or worktable $b$ by means of the bolts or coach screws $c$, holes $d$ being provided in one end of the base $a$ for this purpose. At the other end of the base $a$ are provided two upstanding brackets $e$ and between the same the slot $f$ is situated in the base. A slot $g$ is also provided on the upper edge of each of the brackets $e$.

Given a device as described it will be obvious that in order to utilize a chain pipe wrench as a pipe vise it is merely necessary to secure the base $a$ to the bench or work table $b$ by means of the coach screws $c$ and to place the wrench, handle downwards as shewn in Figure 2, between the brackets $e$, with the heads $h$ of the pins that hold the jaw resting in the grooves $g$, and secure the same therein by means of the set screws $k$ that engage the sides of the housing $l$, the handle $m$ depending through the slot $f$.

A pipe length P to be worked on may then be placed on the V $n$ of the jaw and the chain $o$ adjusted around the pipe P.

It will be obvious that the handle $m$ is used in the usual manner for securing and releasing the pipe P, presuming two men are employed, the chain being adjusted by means of the nut $r$. When only one man is available however the alternative means shewn in Figure 3 may be employed instead of the nut $r$. In this construction an eye bolt $s$ to which the adjusting end of the chain $o$ is attached is screwed into the nut $t$ operable by the bar $w$ by the operation of which the chain $o$ may be adjusted as required to increase the grip on the pipe P and the lever handle $m$ need not be employed.

The device described and illustrated with suitable modifications will accommodate any other type of pipe wrench with a view to its employment as a pipe vise.

What I claim is:—

1. A device comprising a base provided with a slot, a bracket on each side of said slot, means for securing said base to a work table and means for securing a pipe wrench between said brackets with the handle of said wrench depending through said slot.

2. A device comprising a base provided with a slot, a bracket on each side of said slot provided with a slot on its upper edge, means for securing said base to a work table, and means for engaging a pipe wrench inserted between said brackets and securing same with its handle depending through the slot in said base.

3. The combination with a chain pipe wrench of a device converting said pipe wrench into a pipe vise, said device comprising a base provided with a slot, an upstanding bracket on each side of said slot integral with said base and provided with means for accommodating one part of said pipe wrench, means for securing said base to a worktable and means for securing another part of said pipe wrench inserted between said brackets with the handle thereof depending through said slot.

4. The combination with a chain pipe wrench of a device converting said pipe wrench into a pipe vise, said device comprising a base provided with a slot, an upstanding bracket on each side of said slot integral with said base and provided with means for accommodating one part of said pipe wrench, means for securing said base to a work table, means for securing another part of said pipe wrench inserted between said brackets with the handle thereof depending through said slot, and means for adjusting the chain of said chain pipe wrench.

In testimony whereof I affix my signature.

FRANK BERTRAM CHISWELL SUTTHERY.